(12) United States Patent
Tseng et al.

(10) Patent No.: US 9,360,606 B2
(45) Date of Patent: Jun. 7, 2016

(54) COLOR FILTER SUBSTRATE AND DISPLAY PANEL

(71) Applicant: INNOLUX CORPORATION, Chu-Nan, Miao-Li County (TW)

(72) Inventors: Yao-Teng Tseng, Chu-Nan (TW); Tsung-Han Tsai, Chu-Nan (TW); Ying-Tong Lin, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 73 days.

(21) Appl. No.: 14/486,206

(22) Filed: Sep. 15, 2014

(65) Prior Publication Data

US 2016/0011347 A1 Jan. 14, 2016

(30) Foreign Application Priority Data

Jul. 8, 2014 (TW) ............................ 103123424 A

(51) Int. Cl.
*G02F 1/1335* (2006.01)
*G02B 5/20* (2006.01)

(52) U.S. Cl.
CPC .......... *G02B 5/201* (2013.01); *G02F 1/133514* (2013.01); *G02F 1/133512* (2013.01)

(58) Field of Classification Search
None
See application file for complete search history.

(56) References Cited

U.S. PATENT DOCUMENTS 6,271,902 B1 * 8/2001 Ogura .................... G02B 5/201
349/106

FOREIGN PATENT DOCUMENTS

| JP | 2000-111724 A | 4/2000 |
| JP | 2008-020517 A | 1/2008 |
| JP | 2011-107379 A | 6/2011 |

OTHER PUBLICATIONS

Report of Utility Model Technical Opinion issued by the Japan Patent Office for corresponding Japanese Utility Model Application No. 2014-004796 on Mar. 29, 2016.

* cited by examiner

*Primary Examiner* — Richard Kim
(74) *Attorney, Agent, or Firm* — Liu & Liu

(57) ABSTRACT

An embodiment of the invention provides a color filter substrate which includes: a substrate having a surface; a light-shielding layer disposed on the surface; a first color filter layer; and a second color filter layer disposed on the surface, the light-shielding layer has a first sidewall in direct contact with the first color filter layer, the first sidewall and the surface form a first angle, the light-shielding layer has a second sidewall in direct contact with the second color filter layer, the second sidewall and the surface form a second angle, and the second angle is less than the first angle.

19 Claims, 5 Drawing Sheets

COLOR FILTER SUBSTRATE AND DISPLAY PANEL

CROSS REFERENCE TO RELATED APPLICATIONS

This Application claims priority of Taiwan Patent Application No. 103123424, filed on Jul. 8, 2014, the entirety of which is incorporated by reference herein.

BACKGROUND OF THE INVENTION

1. Field of the Invention

The present invention relates to a display panel, and in particular relates to a color filter substrate of the display panel.

2. Description of the Related Art

Liquid-crystal displays have many advantages, such as being light, thin, and having low power consumption, so liquid-crystal displays have become the mainstream displays. A liquid-crystal display includes a liquid-crystal display panel. The liquid-crystal display panel includes a thin-film transistor substrate, a color filter substrate, and a liquid-crystal layer sandwiched therebetween.

The color filter substrate has a substrate and a color filter layer formed thereon, and the color filter layer is composed of a plurality of red, green, and blue pixels and a black matrix separating the pixels from each other. The black matrix can prevent thin-film transistors from being exposed to light (the thin-film transistors exposed to light may produce current leakage, which can adversely affect image quality), prevent color mixture between adjacent pixels, and improve contrast.

Along with the trend towards thin and high transmission liquid-crystal displays, a method for reducing the thickness of a color filter substrate is needed.

BRIEF SUMMARY OF THE INVENTION

An embodiment of the invention provides a color filter substrate which includes: a substrate having a surface; a light-shielding layer disposed on the surface; a first color filter layer disposed on the surface, wherein the first color filter layer covers the light-shielding layer; and a second color filter layer disposed on the surface, wherein the second color filter layer covers the light-shielding layer and the first color filter layer, wherein the light-shielding layer is located between the first color filter layer and the second color filter layer, the light-shielding layer has a first sidewall in direct contact with the first color filter layer, the first sidewall and the surface form a first angle, the light-shielding layer has a second sidewall in direct contact with the second color filter layer, the second sidewall and the surface form a second angle, and the second angle is less than the first angle.

An embodiment of the invention provides a color filter substrate, which includes: a substrate having a surface; a light-shielding layer disposed on the surface; a first color filter layer disposed on the surface, wherein the first color filter layer covers the light-shielding layer; and a second color filter layer disposed on the surface, wherein the second color filter layer covers the light-shielding layer and the first color filter layer, wherein the light-shielding layer is located between the first color filter layer and the second color filter layer, the light-shielding layer has a first sidewall in direct contact with the first color filter layer, the first sidewall and the surface form a first angle, the light-shielding layer has a second sidewall in direct contact with the second color filter layer, the second sidewall and the surface form a second angle, and a difference between the first angle and the second angle ranges from about 3.5° to about 20°.

An embodiment of the invention provides a color filter substrate, which includes: a substrate having a surface; a light-shielding layer disposed on the surface, wherein the light-shielding layer has a maximum height, and a predetermined height is a half of the maximum height; a first color filter layer disposed on the surface, wherein the first color filter layer covers the light-shielding layer; and a second color filter layer disposed on the surface, wherein the second color filter layer covers the light-shielding layer and the first color filter layer, wherein the light-shielding layer is located between the first color filter layer and the second color filter layer, the light-shielding layer has a first sidewall in direct contact with the first color filter layer, a first tangent line to the first sidewall at the predetermined height and the surface form a first included angle, the light-shielding layer has a second sidewall in direct contact with the second color filter layer, a second tangent line of the second sidewall at the predetermined height and the surface form a second included angle, and the second included angle is less than the first included angle.

An embodiment of the invention provides a display panel, which includes: a color filter substrate; an opposite substrate disposed opposite to the color filter substrate; and a display medium located between the color filter substrate and the opposite substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It should be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numbers and/or letters in the various examples. This repetition is for the purpose of simplicity and clarity and does not in itself dictate a relationship between the various embodiments and/or configurations discussed. Furthermore, descriptions of a first layer "on," "overlying," (and like descriptions) a second layer, include embodiments where the first and second layers are in direct contact and those where one or more layers are interposing the first and second layers.

Figure 1:
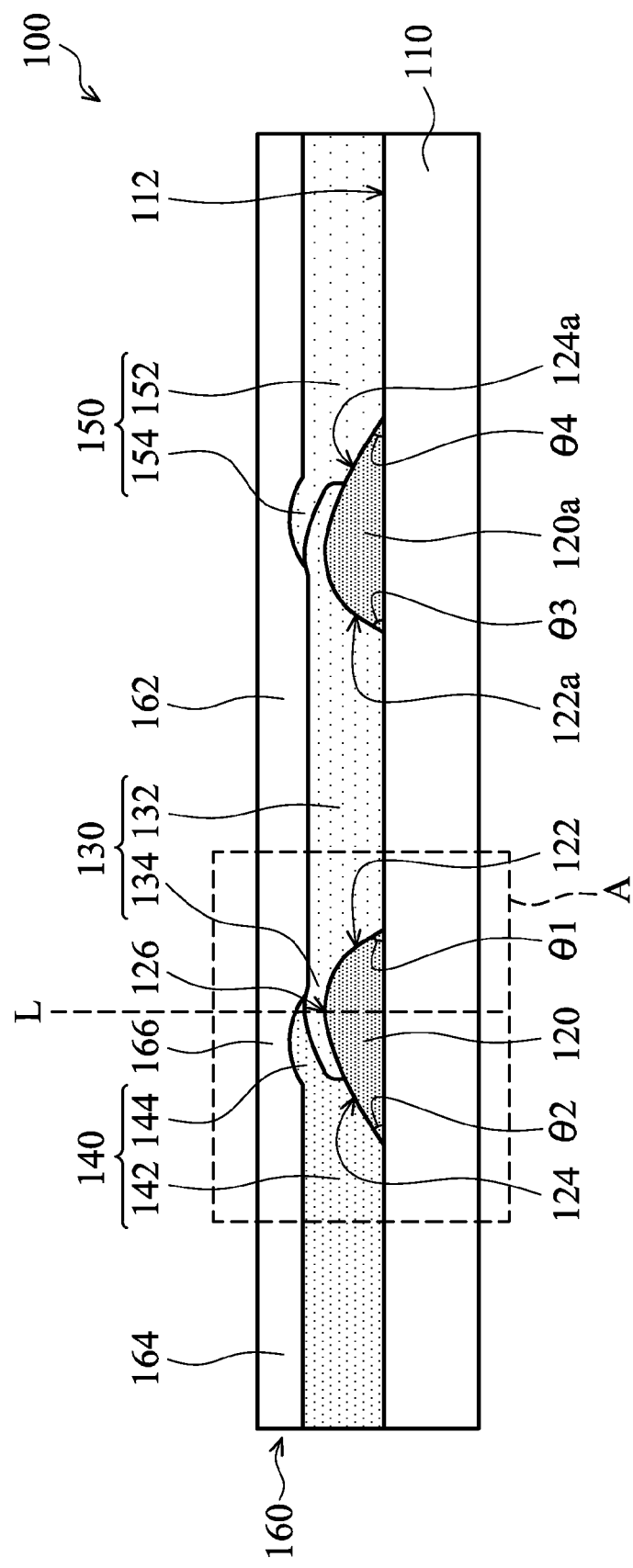
FIG. 1 is a cross-sectional view of a color filter substrate according to an embodiment of the present invention.
Figure 2:
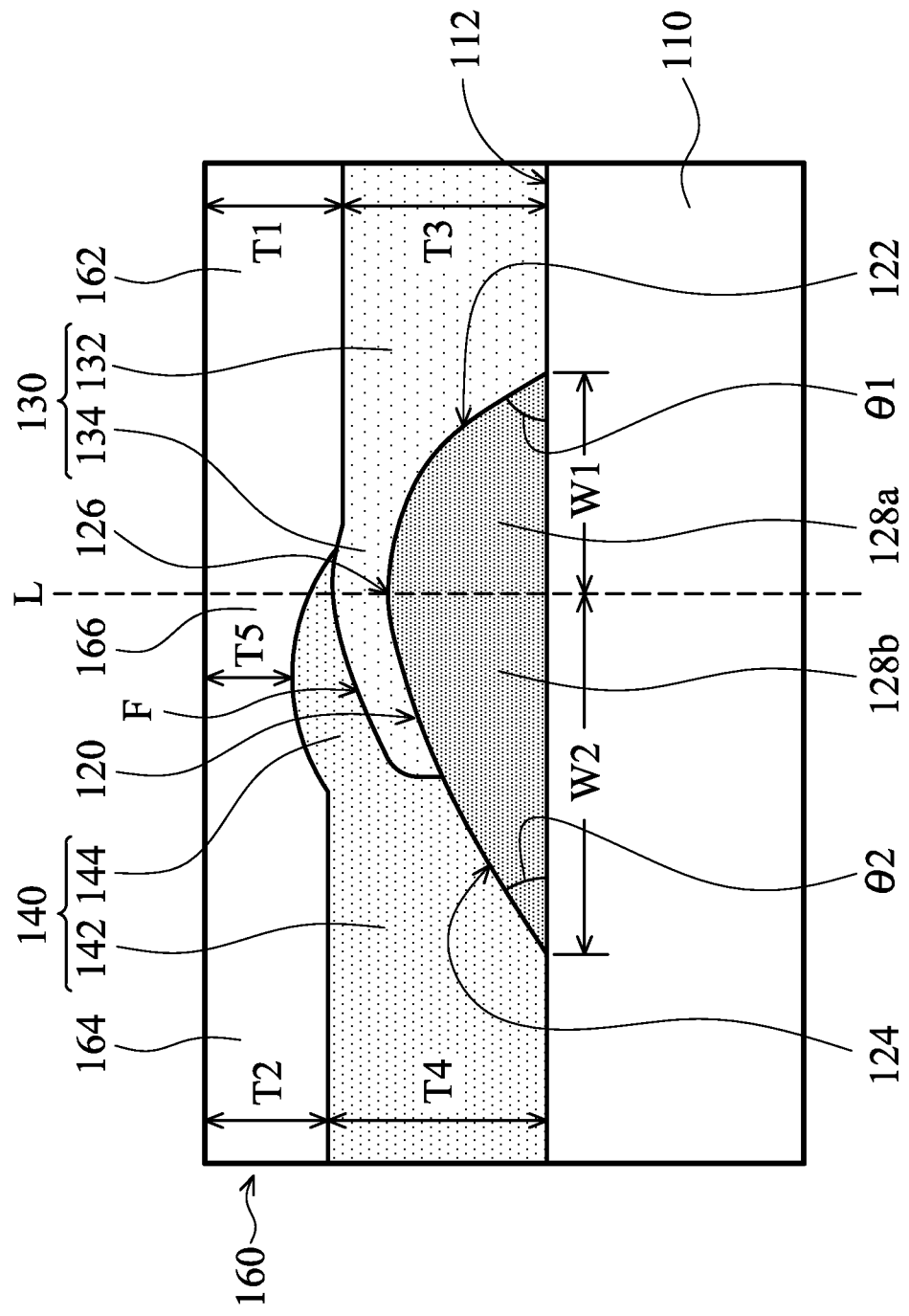
FIG. 2 is an enlarged view of a region A shown in FIG. 1.

FIG. 1 is a cross-sectional view of a color filter substrate 100 according to an embodiment of the present invention. FIG. 2 is an enlarged view of a region A shown in FIG. 1. Referring to FIGS. 1-2, the color filter substrate 100 of the present embodiment includes a substrate 110, a light-shielding layer 120, a first color filter layer 130, and a second color filter layer 140.

Specifically, the substrate 110 has a surface 112. The light-shielding layer 120 is located over the surface 112 of the substrate 110. The first color filter layer 130 is located over the substrate 110 and covers a portion of the light-shielding layer 120. The first color filter layer 130 includes, for example, a photoresist material. The first color filter layer 130 includes, for example, a blue photoresist material, a red photoresist material, or a green photoresist material.

The second color filter layer 140 is located over the substrate 110 and covers a portion of the light-shielding layer 120 and a portion of the first color filter layer 130. The second color filter layer 140 includes, for example, a photoresist material. The second color filter layer 140 includes, for example, a blue photoresist material, a red photoresist material, or a green photoresist material.

The light-shielding layer 120 is located between the first color filter layer 130 and the second color filter layer 140. The light-shielding layer 120 has a first sidewall 122 in direct contact with the first color filter layer 130. The first sidewall 122 and the surface 112 of the substrate 110 form a first angle $\theta 1$.

The light-shielding layer 120 has a second sidewall 124 in direct contact with the second color filter layer 140. The second sidewall 124 and the surface 112 of the substrate 110 form a second angle $\theta 2$. The second angle $\theta 2$ is less than the first angle $\theta 1$. In one embodiment, the first angle $\theta 1$ and the second angle $\theta 2$ are both acute angles. The first angle $\theta 1$ ranges, for example, from about 40° to about 75°. The second angle $\theta 2$ ranges, for example, from about 30° to about 65°. The difference between the first angle $\theta 1$ and the second angle $\theta 2$ ranges, for example, from about 3.5° to about 20°.

Specifically, in the present embodiment, the first color filter layer 130 has a first main body 132 on the substrate 110 and a first extension portion 134 on the light-shielding layer 120. The second color filter layer 140 has a second main body 142 on the substrate 110 and a second extension portion 144 on the light-shielding layer 120. The light-shielding layer 120 is located between the first main body 132 and the second main body 142. The first sidewall 122 faces the first main body 132, and the second sidewall 124 faces the second main body 142.

In the present embodiment, the light-shielding layer 120 has a vertex 126. The height of the vertex 126 is equal to the maximum height of the light-shielding layer 120. The first sidewall 122 is located at one side of a vertical line L passing through the vertex 126 and perpendicular to the surface 112, and the second sidewall 124 is located at another side of the vertical line L. In the present embodiment, the first color filter layer 130 covers the first sidewall 122 and extends across the vertex 126. Specifically, the first color filter layer 130 covers the first sidewall 122 and a portion of the second sidewall 124.

In the present embodiment, the light-shielding layer 120 includes a photoresist material (such as a black photoresist material). In the present embodiment, a half-tone mask or a mask with a specific pattern is used to perform a photolithography process on a light-shielding material layer (not shown) to form the light-shielding layer 120 with two sidewalls with different slopes. Alternatively, the light-shielding layer 120 has two sides with asymmetric patterns. For example, one side has a flat shape, and another side has a zigzag shape (not shown). The light-shielding layer 120 is heated to reflow so as to form two sidewalls 122 and 124 with different slopes.

In the present embodiment, the second color filter layer 140 covers the second sidewall 124 and extends across the vertex 126. Specifically, the second color filter layer 140 covers the second sidewall 124 and a portion of the first sidewall 122. In the present embodiment, the second color filter layer 140 overlaps the first color filter layer 130, and the overlapping portions of the first color filter layer 130 and the second color filter layer 140 are located substantially on the second sidewall 124.

In one embodiment, an interface F between the overlapping portions of the second color filter layer 140 and the first color filter layer 130 has a slope greater than zero relative to the surface 112. The second color filter layer 140 is located at the left side of the light-shielding layer 120. It should be noted that, in the present invention, the arrangement of the first color filter layer 130 and the second color filter layer 140 relative to the light-shielding layer 120 is not limited to the arrangement shown in FIGS. 1 and 2.

Figure 3:
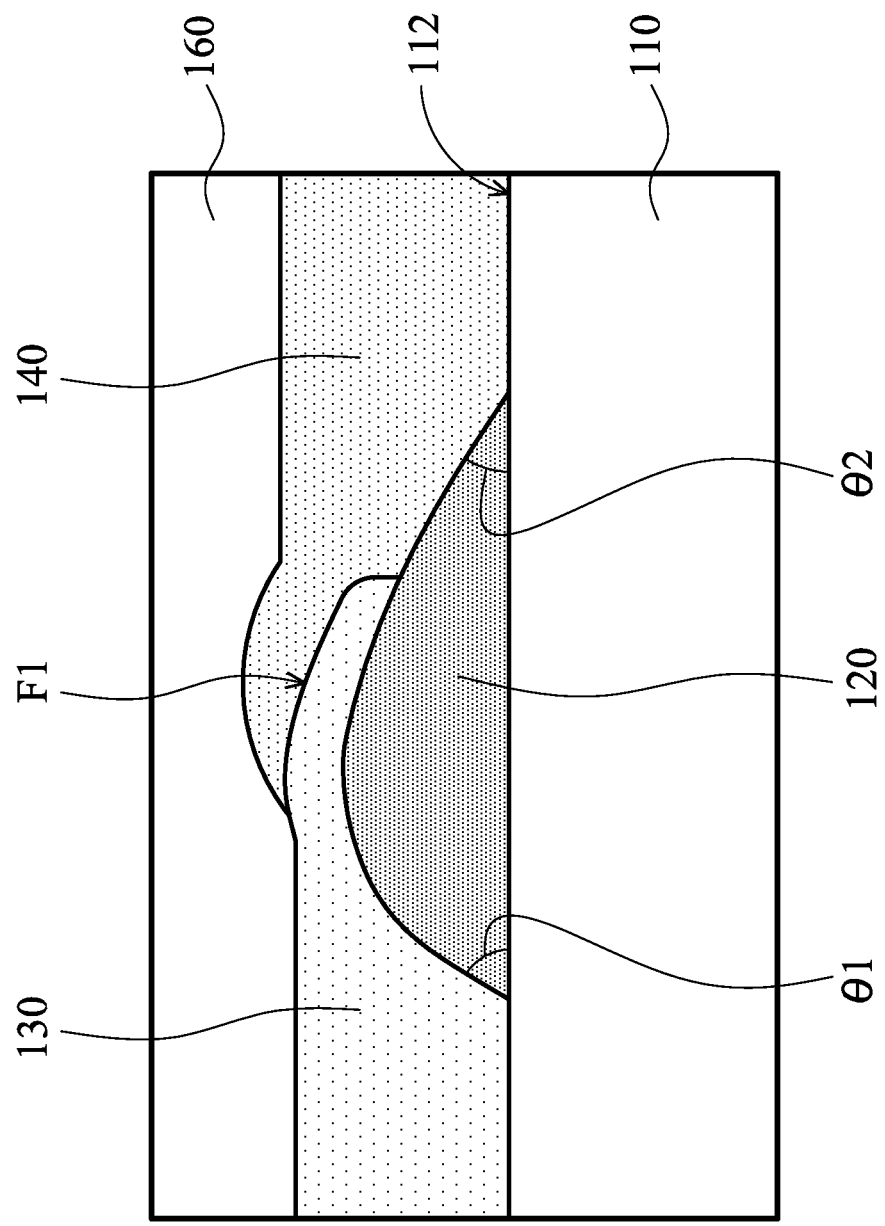
FIG. 3 is a cross-sectional view of a color filter substrate according to an embodiment of the present invention.

For example, as shown in FIG. 3, in another embodiment, an interface F1 between the overlapping portions of the second color filter layer 140 and the first color filter layer 130 has a slope less than zero relative to the surface 112. The second color filter layer 140 is located at the right side of the light-shielding layer 120.

Referring to FIGS. 1 and 2, in one embodiment, the color filter substrate 100 further includes a third color filter layer 150. The third color filter layer 150 is disposed on the surface 112 of the substrate 110, and a light-shielding layer 120a is located between the first color filter layer 130 and the third color filter layer 150. The third color filter layer 150 includes, for example, a photoresist material. The third color filter layer 150 includes, for example, a blue photoresist material, a red photoresist material, or a green photoresist material. In one embodiment, the first color filter layer 130, the second color filter layer 140, and the third color filter layer 150 have different colors.

The third color filter layer 150 has a third main body 152 over the substrate 110 and a third extension portion 154 over the light-shielding layer 120a. The light-shielding layer 120a has a third sidewall 122a facing the first main body 132 and a fourth sidewall 124a facing the third main body 152. In the present embodiment, the third color filter layer 150 covers a portion of the first color filter layer 130.

The third sidewall 122a and the surface 112 of the substrate 110 forms a third angle $\theta 3$. The fourth sidewall 124a and the surface 112 of the substrate 110 forms a fourth angle $\theta 4$. The fourth angle $\theta 4$ is less than the third angle $\theta 3$. In one embodiment, the third angle $\theta 3$ and the fourth angle $\theta 4$ both acute angles. The third angle $\theta 3$ ranges, for example, from about 40° to about 75°. The fourth angle $\theta 4$ ranges, for example, from about 30° to about 65°. The difference between the third angle $\theta 3$ and the fourth angle $\theta 4$ ranges, for example, from about 3.5° to about 20°.

In one embodiment, the color filter substrate 100 further includes a planarization layer 160. The planarization layer 160 is located on the first color filter layer 130 and the second color filter layer 140. In one embodiment, the planarization layer 160 is further located on the third color filter layer 150.

The planarization layer 160 is configured to form a planar surface over the first color filter layer 130, the second color filter layer 140, and the third color filter layer 150 to avoid protrusions of the color filter layers affecting the display medium (such as liquid-crystal molecules) formed thereon subsequently. Therefore, if the height of the protrusions of the color filter layer is less, the thickness of the planarization layer 160 is less.

In one embodiment, the planarization layer 160 has a first area 162 and a second area 164. The first area 162 is located on the first main body 132 of the first color filter layer 130. The second area 164 is located on the second main body 142 of the second color filter layer 140. In one embodiment, the thickness T4 of the second main body 142 of the second color filter layer 140 is greater than the thickness T3 of the first main body 132 of the first color filter layer 130. A thickness T2 of the second area 164 is less than a thickness T1 of the first area 162.

In the present embodiment, the planarization layer 160 further has a third area 166 on the overlapping portions of the first color filter layer 130 and the second color filter layer 140, and a thickness T5 of the third area 166 is less than the thickness T2 of the second area 164.

It should be noted that, in the present embodiment, since the second angle θ2 is less than the first angle θ1, the absolute value of the slope of the second sidewall 124 is less than the absolute value of the slope of the first sidewall 122. A first portion 128a of the light-shielding layer 120 forms the first sidewall 122. The first portion 128a has a first average thickness. The first average thickness is equal to a ratio of the cross-sectional area of the first portion 128a to the width W1 of the first portion 128a. A second portion 128b of the light-shielding layer 120 forms the second sidewall 124. The second portion 128b has a second average thickness. The second average thickness is equal to a ratio of the cross-sectional area of the second portion 128b to the width W2 of the second portion 128b. The second average thickness is less than the first average thickness.

Since the second average thickness is less, the arrangement of the overlapping portions (of the second color filter layer 140 and the first color filter layer 130) over the second sidewall 124 may effectively reduce the height of the overlapping portions, which may effectively reduce the thickness of the planarization layer 160. The reduction of the thickness of the planarization layer 160 may effectively improve the light transmittance of the color filter substrate 100.

Figure 4:
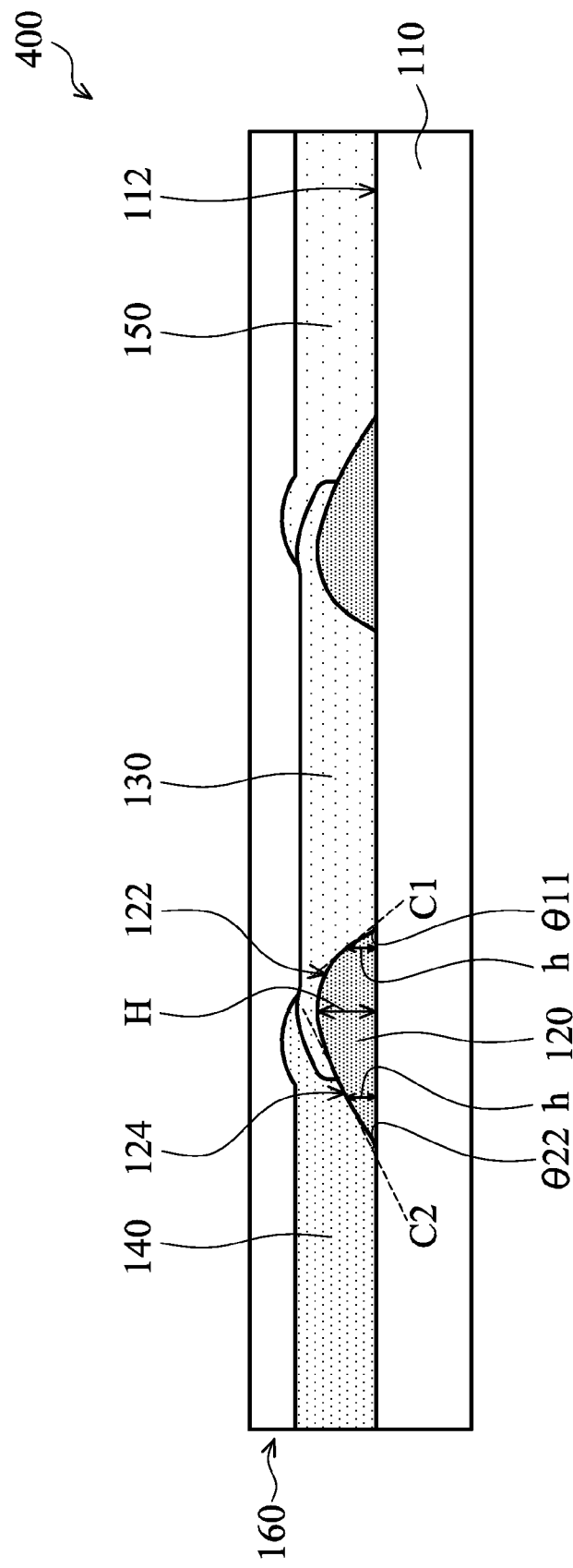
FIG. 4 is a cross-sectional view of a color filter substrate according to an embodiment of the present invention.

FIG. 4 is a cross-sectional view of a color filter substrate 400 according to an embodiment of the present invention. As shown in FIG. 4, the color filter substrate 400 of the present embodiment is similar to the color filter substrate 100 shown in FIG. 1.

The light-shielding layer 120 of the color filter substrate 400 has a maximum height H, and a predetermined height h is a half of the maximum height H. A first tangent line C1 to the first sidewall 122 of the light-shielding layer 120 at the predetermined height h is provided. The first tangent line C1 and the surface 112 of the substrate 110 form a first included angle θ11. A second tangent line C2 of the second sidewall 124 of the light-shielding layer 120 at the predetermined height h is provided. The second tangent line C2 and the surface 112 of the substrate 110 form a second included angle θ22. The second included angle θ22 is less than the first included angle θ11.

In one embodiment, the first included angle θ11 and the second included angle θ22 are both acute angles. The first included angle θ11 ranges, for example, from about 40° to about 75°. The second included angle θ22 ranges, for example, from about 30° to about 65°. The difference of the first included angle θ11 and the second included angle θ22 ranges, for example, from about 3.5° to about 20°.

Figure 5:
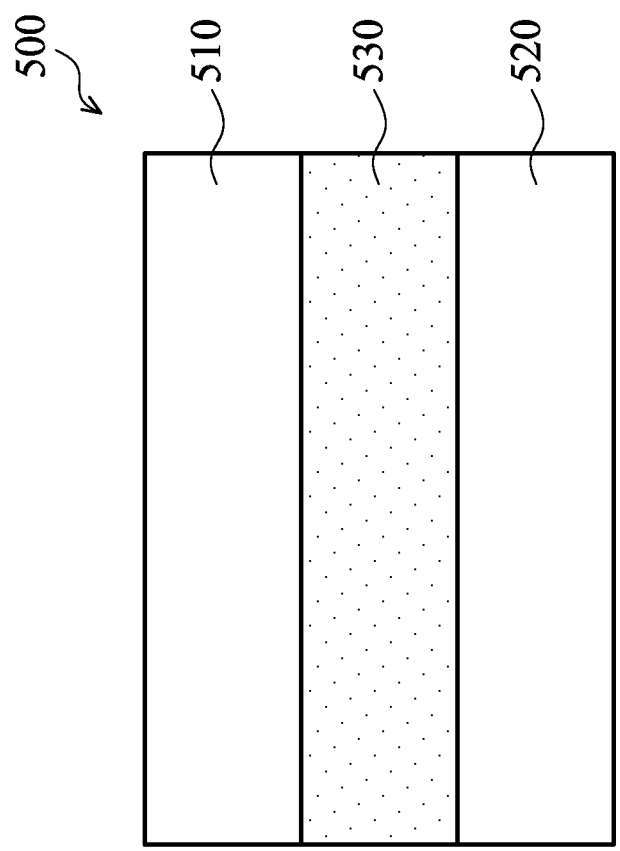
FIG. 5 is a cross-sectional view of a display panel according to an embodiment of the present invention.

FIG. 5 is a cross-sectional view of a display panel 500 according to an embodiment of the present invention. The display panel 500 of the present embodiment includes a color filter substrate 510, an opposite substrate 520, and a display medium 530. The opposite substrate 520 is opposite to the color filter substrate 510. The display medium 530 is formed between the color filter substrate 510 and the opposite substrate 520.

The color filter substrate 510 may be one of the color filter substrates shown in FIGS. 1-4. The opposite substrate 520 is a thin-film transistor substrate or a transparent substrate. The display medium 530 may be a liquid-crystal layer or an organic light-emitting layer.

In light of the foregoing, the light-shielding layer of the color filter substrate of the present embodiment has two sidewalls having different angles with respect to the surface of the substrate, and average thicknesses of the two portions of the light-shielding layer forming the two sidewalls are different from each other. Therefore, the overlapping portions of the second color filter layer and the first color filter layer are disposed over the sidewall formed by the portion with a small average thickness to effectively reduce the height of the overlapping portions of the second color filter layer and the first color filter layer. As a result, the thickness of the planarization layer is effectively reduced. The reduction of the thickness of the planarization layer may effectively improve the light transmittance of the color filter substrate.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color filter substrate, comprising:
   a substrate having a surface;
   a light-shielding layer disposed on the surface;
   a first color filter layer disposed on the surface, wherein the first color filter layer covers the light-shielding layer; and
   a second color filter layer disposed on the surface, wherein the second color filter layer covers the light-shielding layer and the first color filter layer,
   wherein the light-shielding layer is located between the first color filter layer and the second color filter layer, the light-shielding layer has a first sidewall in direct contact with the first color filter layer, the first sidewall and the surface form a first angle, the light-shielding layer has a second sidewall in direct contact with the second color filter layer, the second sidewall and the surface form a second angle, and the second angle is less than the first angle.

2. The color filter substrate as claimed in claim 1, wherein the light-shielding layer has a vertex, the first sidewall is located at one side of a vertical line passing through the vertex and perpendicular to the surface, and the second sidewall is located at another side of the vertical line.

3. The color filter substrate as claimed in claim 2, wherein the first color filter layer covers the first sidewall and extends across the vertex.

4. The color filter substrate as claimed in claim 2, wherein the second color filter layer covers the second sidewall and extends across the vertex.

5. The color filter substrate as claimed in claim 1, wherein the first color filter layer has a first main body on the substrate and a first extension portion on the light-shielding layer, the second color filter layer has a second main body on the substrate and a second extension portion on the light-shielding layer, the light-shielding layer is located between the first main body and the second main body, the first sidewall faces the first main body, and the second sidewall faces the second main body.

6. The color filter substrate as claimed in claim 1, wherein an interface between the overlapping portions of the second color filter layer and the first color filter layer has a slope greater than zero relative to the surface, and the second color filter layer is located at a left side of the light-shielding layer.

7. The color filter substrate as claimed in claim 1, wherein an interface between the overlapping portions of the second color filter layer and the first color filter layer has a slope less than zero relative to the surface, and the second color filter layer is located at a right side of the light-shielding layer.

8. The color filter substrate as claimed in claim 1, further comprising:
a planarization layer disposed over the first color filter layer and the second color filter layer, wherein the planarization layer has a first area on the first color filter layer and a second area on the second color filter layer, and a second thickness of the second area is less than a first thickness of the first area.

9. The color filter substrate as claimed in claim 8, wherein the planarization layer further has a third area on the overlapping portions of the first color filter layer and the second color filter layer, and a third thickness of the third area is less than the second thickness of the second area.

10. The color filter substrate as claimed in claim 1, wherein the first angle and the second angle are both acute angles.

11. The color filter substrate as claimed in claim 10, wherein the first angle ranges from about 40° to about 75°.

12. The color filter substrate as claimed in claim 10, wherein the second angle ranges from about 30° to about 65°.

13. A display panel, comprising:
a color filter substrate as claimed in claim 1;
an opposite substrate disposed opposite to the color filter substrate; and
a display medium located between the color filter substrate and the opposite substrate.

14. A color filter substrate, comprising:
a substrate having a surface;
a light-shielding layer disposed on the surface;
a first color filter layer disposed on the surface, wherein the first color filter layer covers the light-shielding layer; and
a second color filter layer disposed on the surface, wherein the second color filter layer covers the light-shielding layer and the first color filter layer,
wherein the light-shielding layer is located between the first color filter layer and the second color filter layer, the light-shielding layer has a first sidewall in direct contact with the first color filter layer, the first sidewall and the surface form a first angle, the light-shielding layer has a second sidewall in direct contact with the second color filter layer, the second sidewall and the surface form a second angle, and a difference between the first angle and the second angle ranges from about 3.5° to about 20°.

15. The color filter substrate as claimed in claim 14, wherein the first color filter layer has a first main body on the substrate and a first extension portion on the light-shielding layer, the second color filter layer has a second main body on the substrate and a second extension portion on the light-shielding layer, the light-shielding layer is located between the first main body and the second main body, the first sidewall faces the first main body, and the second sidewall faces the second main body.

16. A display panel, comprising:
a color filter substrate as claimed in claim 14;
an opposite substrate disposed opposite to the color filter substrate; and
a display medium located between the color filter substrate and the opposite substrate.

17. A color filter substrate, comprising:
a substrate having a surface;
a light-shielding layer disposed on the surface, wherein the light-shielding layer has a maximum height, and a predetermined height is a half of the maximum height;
a first color filter layer disposed on the surface, wherein the first color filter layer covers the light-shielding layer; and
a second color filter layer disposed on the surface, wherein the second color filter layer covers the light-shielding layer and the first color filter layer,
wherein the light-shielding layer is located between the first color filter layer and the second color filter layer, the light-shielding layer has a first sidewall in direct contact with the first color filter layer, a first tangent line to the first sidewall at the predetermined height and the surface form a first included angle, the light-shielding layer has a second sidewall in direct contact with the second color filter layer, a second tangent line of the second sidewall at the predetermined height and the surface form a second included angle, and the second included angle is less than the first included angle.

18. The color filter substrate as claimed in claim 17, wherein the first color filter layer has a first main body on the substrate and a first extension portion on the light-shielding layer, the second color filter layer has a second main body on the substrate and a second extension portion on the light-shielding layer, the light-shielding layer is located between the first main body and the second main body, the first sidewall faces the first main body, and the second sidewall faces the second main body.

19. A display panel, comprising:
a color filter substrate as claimed in claim 17;
an opposite substrate disposed opposite to the color filter substrate; and
a display medium located between the color filter substrate and the opposite substrate.

* * * * *